Patented Nov. 16, 1937

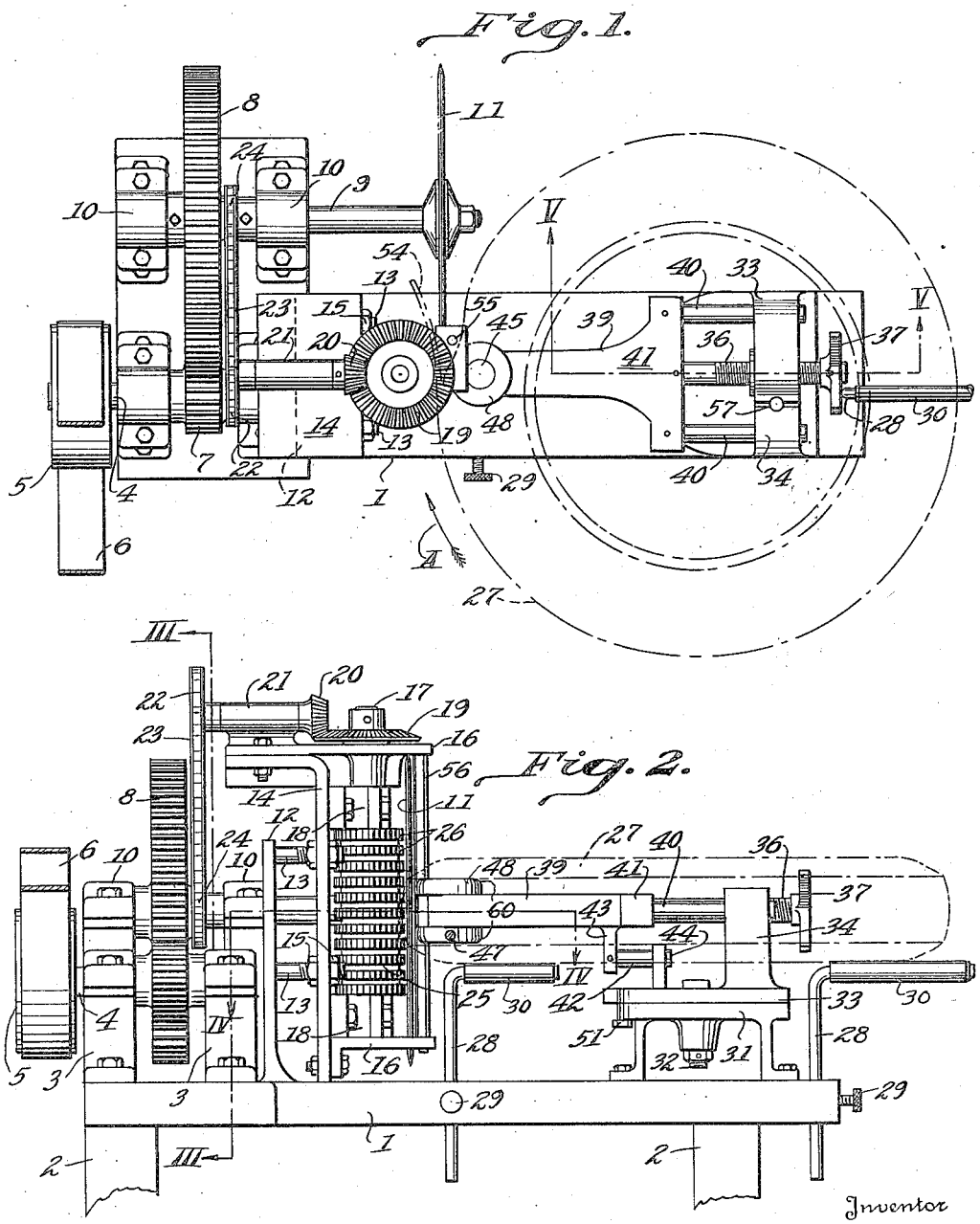

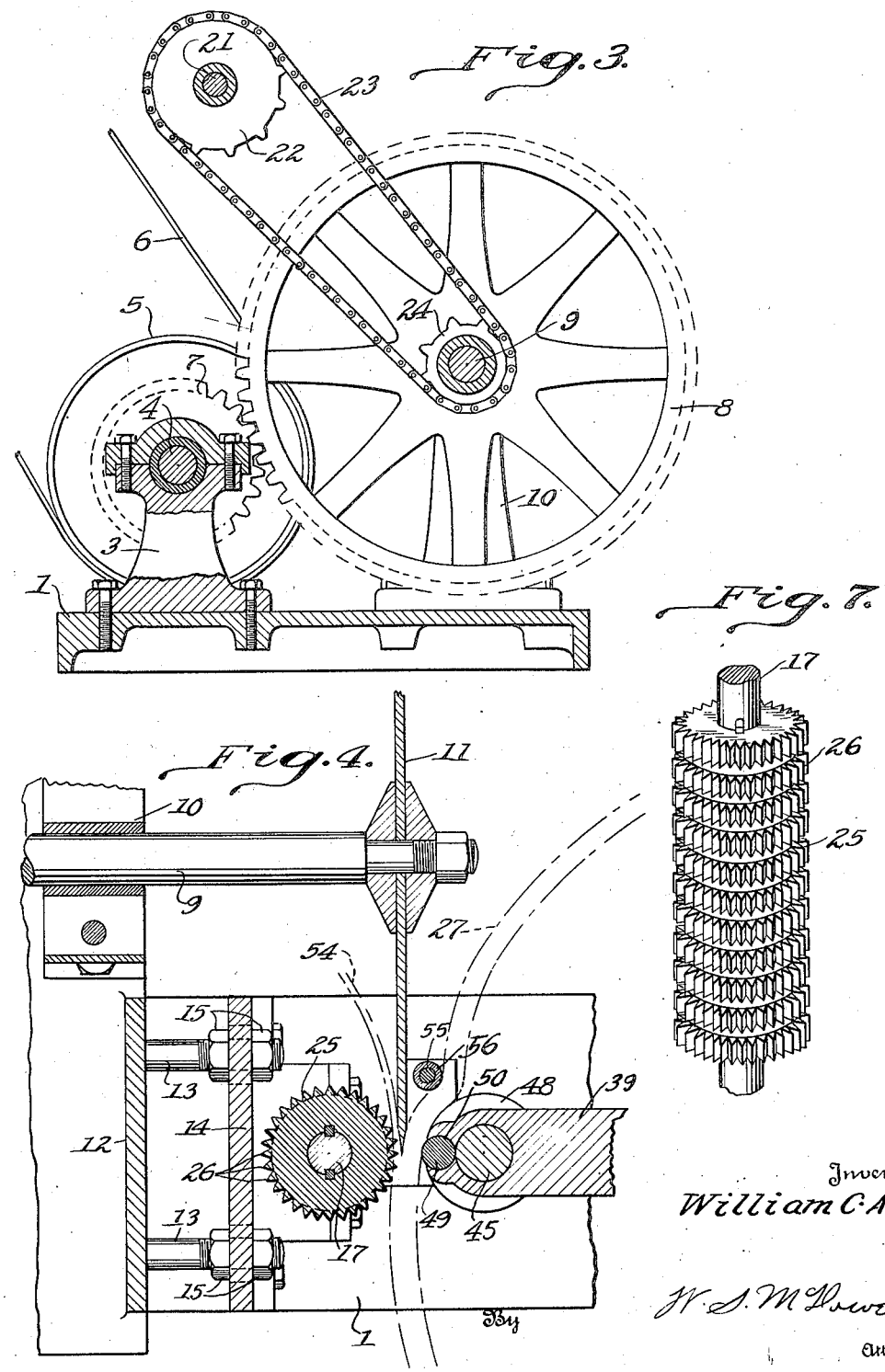

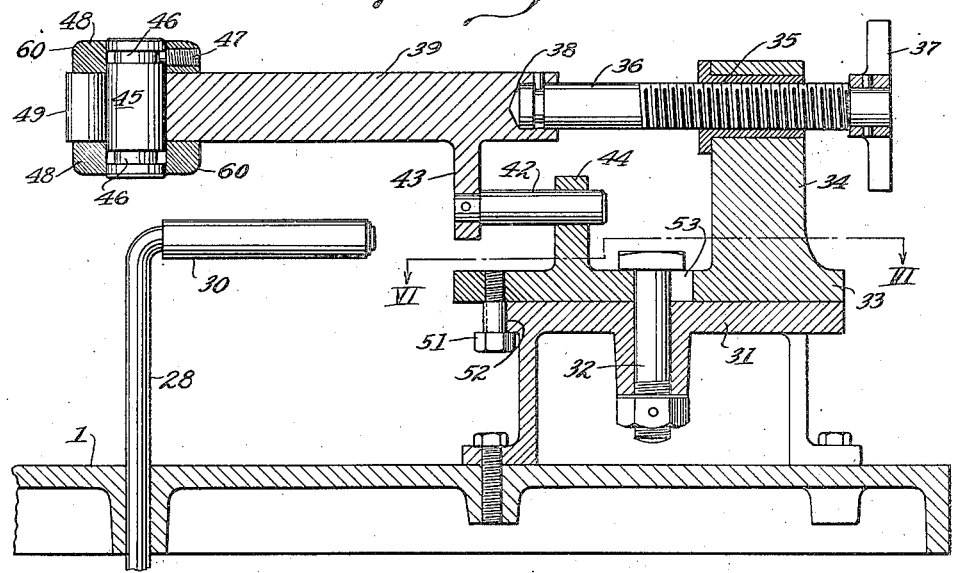
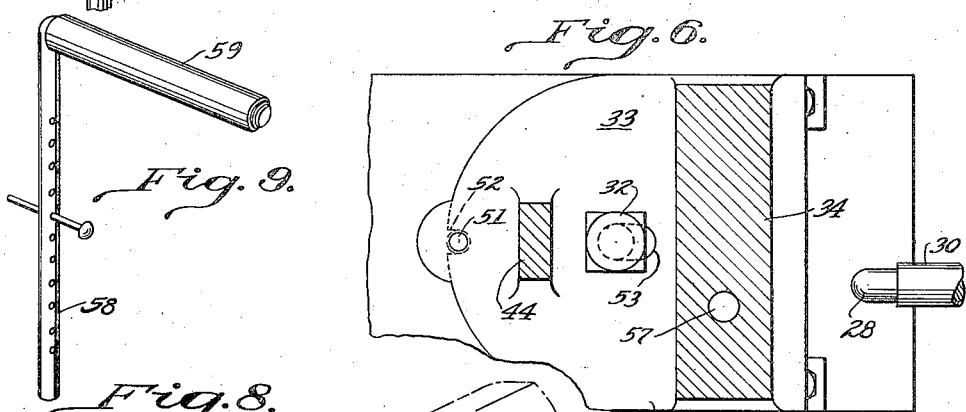
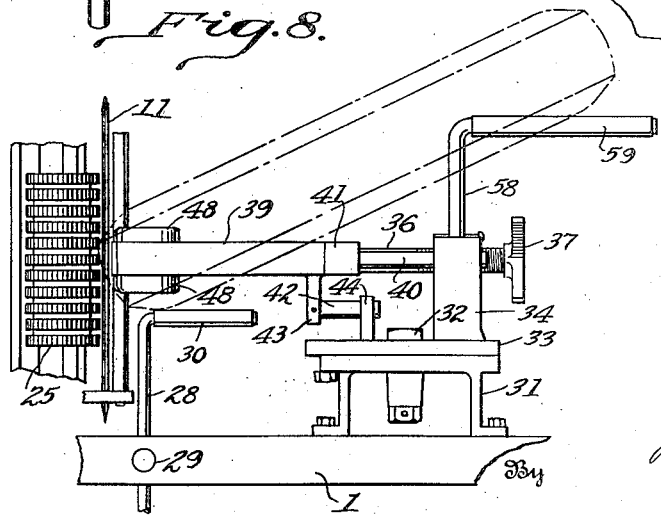

2,099,458

UNITED STATES PATENT OFFICE 2,099,458

MACHINE FOR REMOVING TIRE TREADS

William C. Althen, Columbus, Ohio

Application November 20, 1935, Serial No. 50,732

9 Claims. (Cl. 164—60)

This invention relates to an improved machine for stripping the tread surface of the casing of a used pneumatic motor vehicle tire of worn rubber so that the tire casing may be properly prepared for a retreading operation in which new rubber is vulcanized to the casing to replace that which has been worn and deliberately removed therefrom.

In order to obtain the most effective results in the retreading of worn tires, it is necessary to first remove from the tire tread to a desired depth the soft worn rubber comprising the tread. Usually, when a retreading operation is indicated, the tread region of a tire casing presents areas of soft or loose rubber which has been weakened through use, or which may contain various foreign objects such as bodies of metallic or mineral matter, the latter having penetrated the tread or weakened the same during use of the tire. In order to secure perfect vulcanization of a strong and lasting character between the retreading rubber and the tire casing, it is important that this worn or loosened rubber on the tread should be completely removed, so that the retreading rubber may be directly vulcanized to the strong live rubber areas of the tire casing which have not been deteriorated through tire service.

Accordingly, it is the aim of the present invention to provide a new and improved machine by which the operation of removing the worn and loose rubber from the tread of a tire may be accurately and expeditiously carried out and to this end the present invention comprises the provision of a motor driven rotary cutter against the cutting edge of which the tread of a tire casing is positively advanced in order to sever a strip composed largely of the undesired rubber from the tread of the tire casing.

Another object of the invention resides in the provision of supporting means for holding the tire casing during the tread stripping operation in a substantially horizontal plane with the tread of the casing, adjacent to the rotary cutter in firm frictional engagement with a positively driven rotary feed roll whereby during the operation of the machine, the rotation of said roll will serve to continuously advance the tread of the tire casing into contact with the rotary cutter, in order to sever the strip of worn rubber from the tread of the tire.

With these and other objects in view, which will appear as the description proceeds, the invention consists in the novel features of construction, combination of elements and arrangements of parts hereinafter fully described and pointed out in the appended claims.

In the accompanying drawings:

Fig. 1 is a top plan view of the tire stripping machine comprising the present invention;

Fig. 2 is a view in side elevation;

Fig. 3 is a vertical transverse sectional view on the plane indicated by the line III—III of Fig. 2;

Fig. 4 is an enlarged horizontal sectional view taken on the plane disclosed by the line IV—IV of Fig. 2 and illustrating more particularly the rotary cutter, the feed roll for advancing the tire casing into engagement with the cutter, the pressure arm disposed within the tire casing for maintaining the tread of the tire in frictional engagement with the feed roll, and the guard sleeve for eliminating tire pressure on the rotary cutter;

Fig. 5 is a vertical sectional view on the plane indicated by the line V—V of Fig. 1 and disclosing more particularly the mounting for the swinging pressure arm used for maintaining the tire casing in engagement with the feed roll;

Fig. 6 is a detail horizontal sectional view on the line VI—VI of Fig. 5;

Fig. 7 is a detail perspective view of the feed roll;

Fig. 8 is a detail side elevation disclosing the position of the parts of the machine when used for stripping the shoulder of a tire casing;

Fig. 9 is a perspective view of an adjustable support used in the operation of stripping the shoulder of a tire.

Referring more particularly to the drawings, the numeral 1 designates the bed of the tire stripping machine upon which its operating parts are mounted. This bed may be provided with depending supporting legs 2 of any desired height in order to maintain the bed 1 at a suitable horizontal level. Arising from the bed 1 are spaced brackets 3—3 containing bearings for the reception of a power shaft 4. In this instance, the shaft 4 has been shown as provided with a belt wheel 5 upon its outer end, although any other suitable apparatus for rotating the shaft 4 may be used, such, for example, as an electric motor directly geared with the shaft. As illustrated, however, a belt 6, driven from any suitable source of power, passes around the wheel 5 to provide for the application of power to the machine. Between the brackets 3—3, the shaft 4 is equipped with a pinion 7 disposed in meshing relationship with the teeth of a gear wheel 8, the latter being carried by a horizontally journaled shaft 9, rotatably supported in connection with spaced bearings 10—10 carried by and arising from the bed 1. One end of the shaft 9 carries a rotatable cutting disk or wheel 11, having its outer peripheral edge suitably sharpened in order to provide an effective instrument for the cutting of rubber in an operation of the character set forth.

Arising from the bed or table 1 is a rigid upright 12 which is provided with a plurality of spaced stationary horizontally projecting studs 13, threaded at their outer ends. The threaded portions of these studs pass through openings provided in a longitudinally adjustable bracket 14, the threaded ends of the studs being equipped with nuts 15 by which the adjusted positions of the bracket 14, relative to the upright 12, may be maintained. The bracket 14 includes upper and lower horizontally disposed extensions 16 in which is journaled a vertically extending shaft 17, the latter being also rotatably supported in connection with vertically spaced bearings 18 projecting from the bracket 14. The upper end of the shaft 17 has suitably fixed thereto a bevel gear 19, which meshes with a pinion 20 carried by a short shaft journaled in a bearing 21 carried in connection with the upper portion of the bracket 14 and its upper extension 16. This latter shaft carries at the end thereof opposed to the pinion 20, a sprocket 22, over which is trained an endless chain 23, the latter being also trained over a sprocket 24 fixed on the cutter shaft 9. By this arrangement, whenever power is applied to the machine to effect the rotation of the cutting disk or wheel 11, motion will be imparted to the shaft 17 and the feed roll 25 keyed to rotate therewith. The roll 25 is preferably knurled or milled on its outer periphery as indicated at 26 in order to more effectively engage and grip the tread portion of a tire casing 27 held in engagement, as will be later explained, and to cause the positive advance of the casing toward the cutting edge of the disk 11 in the direction indicated by the arrow A in Fig. 1, whereby to strip the tread of the casing of its worn or loose rubber.

In order to maintain the tire casing in a substantially horizontal position during the stripping of its tread, the bed or table 1 is provided with one or more vertically adjustable stems 28. The vertical portions of these stems may slidably pass through openings provided in the bed or table 1 and maintained in desired vertical positions of adjustment by set screws 29. The upper horizontally extending portions of the stems 28 are equipped with turnable sleeves 30, upon which the lower sides of the tire casing may rest and to provide for the free turning movement of the tire casing about a substantially vertical axis.

To positively hold the casing of the tire in rotating contact with the feed roll 25, the bed or table 1 is provided with a stationary support 31 from which arises an axially disposed bolt 32. Turnable about the axis afforded by the bolt 32 and resting upon the upper surface of the support 31 is a bearing bracket 33 having formed therewith an upstanding web 34. Formed in the center of this web is a threaded bearing 35 in which is received the threaded portion of a horizontally disposed adjusting screw 36. The outer end of this screw is equipped with a hand wheel 37, while the inner end thereof is swiveled for rotary movement within a socket 38 formed in one end of a pressure arm 39. The arm 39 is supported for rotation in connection with the bearing bracket 33 and is slidable radially thereof through the provision of the screw 36 and by the provision of plain guide rods 40 which project rigidly from the enlarged inner end 41 of said arm and are slidably received within bearing openings provided in the opposite sides of the web 34. Additional support for the pressure arm is made available through the provision of a short rod 42 secured to a lug 43 depending from the end 41, the rod 42 being slidably received within an opening provided in an upstanding ear 44 integrally projecting in an upward direction from the bracket 33.

The outer end of the pressure arm carries a vertically extending stud 45. The ends of this stud project above and below the corresponding surfaces of the pressure arm and are formed with annular grooves 46. These grooves receive the inner reduced ends of screws 47 which are carried by rollers 48 arranged horizontally above and below the outer end of the arm 39. In addition to the rollers 48, the outer end of the pressure arm carries a vertically disposed roller 49 which, as shown more particularly in Fig. 4, is supported for rotation within a vertical socket 50 provided in the outer end of said arm, in order that the outer peripheral portion of the roller 49 will project beyond the walls of the socket 50. To relieve pressure on the screw 36 and the bearing 35 when the pressure arm is actively positioned as disclosed in Figs. 4 and 5, the base portion of the bracket 33 is formed with a depending stud 51, which is receivable within a notch 52 formed in the upper edge of the base support 31. By this construction, the pressure arm is rigidly maintained in its active position and the bearing bracket 33 is prevented from rotating about the axis afforded by the bolt 32. The opening in the base of the bearing bracket 33 through which the shank of the bolt 32 extends is also elongated as indicated at 53 so that in order to rotate the pressure arm to its inactive position, it is necessary to rotate the screw 36 to withdraw the rollers 48 and 49 from contact with the inner walls of the tire casing. When this is done, the bearing bracket may be moved forwardly a sufficient distance to release the stud 51 from engagement with the walls of the notch 52, which will allow the bearing bracket and its associated pressure arm to be swung to a position substantially at right angles to their normal active positions, thereby providing for the convenient release of the tire casing from its mounted position on the machine, or to facilitate the mounting of a tire casing on the machine.

In the operation of the apparatus, in order to strip worn or undesirable rubber from the tread of a used tire casing, the pressure arm is positioned so that it will be disposed in a horizonal plane approximately at right angles to the longitudinal axis of the bed or table 1. The side walls of the tire casing are then spread at a point adjacent to the rollers 48 and 49 by the pressure arm so that said rollers will be disposed within the confines of the side walls of the tire casing. At this time, the bearing bracket 33 and the pressure arm associated therewith are swung about the axis of the bolt 32 through a circle segment of approximately 90°, in order to bring the rollers 48 and 49 into engagement with the interior of the tire casing in approximate registration with the feed roll 25 and to register the stud 51 with the notch 52. The screw 36 is then tightened by the manipulation of the hand wheel 37 in order to force the rollers 48 and 49 forwardly and to firmly confine the tread portion of the casing between the pressure arm rollers 48 and 49 and the feed roll 25, with the stud 51 occupying the notch 52.

The rotation of the cutter disk or wheel 11 may then be started by applying power to the shaft 4 which results simultaneously in the rotation of the disk or wheel 11 and the vertically journaled feed roll 25. The tire casing may be partially supported and guided by the operator of the machine during the removal of the rubber strip 54 from the tread of the tire casing, although the rotation of the feed roll will control the speed of turning movement of the tire casing and the sleeve or sleeves 30 and the support of said casing in a substantially horizontal plane. The free rotation of the cutter wheel 11 is secured by the provision of a rigid vertical guide 55 which is carried by the upper and lower extensions 16 of the bracket 14 and is surrounded by a loosely rotatable sleeve 56. This guide sleeve spaces the tread of the tire casing, as shown in Fig. 4, from the sides of the cutter wheel and prevents the tire casing from frictionally engaging the sides of the wheel to interfere with its rotation, or to thus prevent undue heating thereof.

As the cutting edge of the disk or wheel becomes worn, the bracket 14 may be adjusted laterally of the upright 12 by means of the studs 13 and the nuts 15 or, in some instances, the depth of the cut afforded by the wheel may vary the distance between the bracket 14 and the upright 12. Usually, however, the depth of the cut is regulated by the pressure applied to the rollers 48 and 49 through the screw 36 of the pressure arm.

After a complete strip has been removed from the periphery of the tire casing, the rotation of the cutter wheel is discontinued and the stripped tire casing removed from the machine by merely loosening the screw 36. This retracts the rollers 48 and 49 from their firm frictional engagement with the inner wall of the tire casing and permits of relative movement between the bearing bracket 33 and the support 31, so that the stud 51 may be released from the notch 52 and the bearing bracket 31 and its associated pressure arm rotated about the axis of the bolt 32. When the pressure arm is out of registration with the feed roll, the tire casing may be lifted from its supporting sleeves 39 and the side walls of the casing spread sufficiently to permit of the withdrawal of the casing from engagement with the rollers 48 and 49.

In some instances, it is desirable not only to remove a strip of rubber from the tread portion only of an inner casing but also from the shoulder or side wall regions thereof. This can be conveniently accomplished, as shown in Fig. 8, by providing the bearing bracket 33 with a socket 57 in which is adjustably mounted a stem 58 carrying a horizontal roller 59 at its upper end, by which the tire casing, instead of being mounted in a true horizontal plane, is maintained at an inclined position with respect to the horizontal, so that the cutter disk or knife 11 will remove a strip from the shoulders and sides of the tire casing. When the shoulder area is cut on one side, the position of the tire may be reversed in order to present the other side or shoulder of the casing to the cutter. The upper peripheral edges of the rollers 48 are preferably round as at 60 in order to prevent these rollers from marring, scoring or injuring the wall structure of the tire casing.

In view of the foregoing, it will be seen that the present invention provides a simple yet efficient machine for rapidly and accurately stripping the outer peripheral portion of a tire casing to remove undesired rubber therefrom preparatory to retreading operations. The machine is simple, sturdy and efficient in construction and quickly and effectively accomplishes an operation heretofore usually done by hand in a slow and laborious manner.

While I have described but a single embodiment of my invention, nevertheless it will be understood that the same is subject to considerable variation and modification by those skilled in the art without departing from the spirit and scope of the invention as the latter has been defined in the following claims.

What is claimed is:

1. Apparatus for removing worn rubber from the outer tread portion of a pneumatic tire casing preparatory to a retreading operation, comprising a supporting frame, a plurality of antifriction supports carried by said frame and engageable with the side walls of a tire casing to support the latter for rotation in a substantially horizontal plane in connection with said frame, a vertically journaled power driven feed roll carried by said frame and arranged for engagement with the outer tread portion of a tire casing mounted on said supports, means carried by said frame and arranged within the confines of the tire casing mounted on said supports and adjustable radially of the tire casing to engage the inner surfaces thereof to maintain said tire casing in rotatable contact with said feed roll, a cutting disk rotatable in a vertical plane, said disk being rotatably supported by said frame and having its cutting edge disposed for engagement with the outer circumferential portion of the tire casing contiguous to said feed roll, and means for simultaneously rotating said cutter and said feed roll.

2. In apparatus for removing worn rubber from the tread of a used tire casing preparatory to a retreading operation, a supporting frame, vertically adjustable stems carried by said frame, the upper ends of said stems terminating in horizontally disposed portions having antifriction rolls mounted thereon, said rolls being disposed for engagement with the under side of a tire casing disposed in a substantially horizontal plane, a bracket carried by said frame and turnable about a substantially vertical axis, a pressure applying arm carried by said bracket, threaded means for adjusting said arm relative to said bracket and radially of a tire casing positioned on said stems, rollers carried by the outer end of said arm and adapted for pressure contact with the inner walls of a tire casing, a vertically journaled feed roller engaging with the outer tread of said tire casing in horizontal registration with the rollers on said pressure arm, a cutting disk rotatable in a vertical plane and engaging with the outer tread of the tire casing contiguous to said feed roller, and means for simultaneously rotating said disk and feed roller.

3. In a machine for removing worn rubber from the tread region of a tire casing, a bed frame, a cutter disk rotatably mounted in connection with said frame, a feed roller supported by said bed contiguous to the outer edge of said disk, a pair of spaced longitudinally aligned supports carried by said frame on which a tire casing is placed for engagement with said feed roller, means carried by said frame between said supports and operating on the interior of the tire casing to maintain the outer tread of the latter in engagement with said feed roller, and means for maintaining said supports in vertical positions of relative adjustment to vary the angle of presentation of the tire casing to said feed roller and cutter.

4. A machine for removing rubber from the tread region of the casing of a pneumatic tire, comprising a base, a cutter disk supported by said base for rotation in a substantially vertical plane, a vertically rotatable feed roller supported by said base in engagement with the tread of a tire casing in advance of the cutting edge of said disk, an adjustable pressure applying arm carried by said base and movable radially of the tire casing to maintain the tread of the latter in rotating engagement with said feed roller, and vertically adjustable supports carried by said base on which the weight of the tire casing is received when in engagement with said feed roller, said supports being mounted independently on said base with respect to said pressure applying arm.

5. Apparatus for removing worn rubber from the tread of a tire casing, comprising a base frame, tire supports adjustable vertically of said frame to receive the tire casing in a substantially horizontal plane, a feed roll, adjustable means carried by said frame and movable radially in the plane of said casing when carried by said supports to maintain the outer tread surface of said casing in contact with said feed roll, and a cutter disk rotatably mounted in connection with said frame and disposed for engagement with the tread of the tire casing contiguous to said feed roll.

6. In a machine for removing worn rubber from the tread surface of a used tire casing of the type having a base frame on which is mounted a power driven feed roll and cutter disk formed for engagement with the outer tread of the tire casing, a pair of stems adjustable vertically with respect to said frame, the upper ends of said stems terminating in horizontally directed portions upon which a tire casing is placed for rotatable support in a substantially horizontal plane, means for maintaining said stems in relative positions of vertical adjustment, and an arm carried by said base and turnable about a substantially vertical axis, the outer end of said arm being provided with antifriction devices disposed for engagement with the inner walls of the tire casing to press the latter into engagement with said feed roll.

7. In a machine for removing worn rubber from the tread of a tire casing, a base, a bracket carried by said base and turnable about a vertical axis, a radially projecting arm carried by said bracket and adjustable longitudinally with respect thereto, threaded means uniting said arm with said bracket to vary the longitudinal adjustment of said arm, and tire engaging roller means carried by the outer end of said arm.

8. In apparatus for removing worn rubber from the tread of a tire casing, a base frame, a bracket mounted on said base frame for turning movement about a substantially vertical axis, a pressure applying arm mounted on said bracket for adjustment radially with respect thereto, threaded means uniting the inner end of said arm with said bracket to vary the radial adjustment of said arm, rollers carried by the outer end of said arm for engagement with the inner side of a tire casing, and means for holding said bracket against rotation about said vertical axis when said arm is in pressure applying engagement with the tire casing.

9. In a machine of the class described, a base, a fulcrum stud arising vertically from said base, a bracket having an elongated opening formed therein for the reception of said stud, said bracket being rotatable about the axis of said stud and longitudinally movable with respect to said base to a limited degree controlled by the length of the opening formed in said bracket for the reception of said stud, a pressure applying arm carried by and radially adjustable with respect to said bracket, a screw journaled in a threaded bearing carried in said bracket and connected with the inner end of said arm for regulating the radial adjustment of the latter, antifriction means carried by the outer end of said arm and disposed for engagement with the inner side of a tire casing, and an element carried by said bracket and receivable within a recess formed in said base when said antifriction means are in pressure applying engagement with a tire casing to prevent rotation of said bracket about the axis of said stud.

WILLIAM C. ALTHEN.